United States Patent [19]

Wobermin

[11] Patent Number: 5,142,273

[45] Date of Patent: Aug. 25, 1992

[54] SYSTEM FOR GENERATING COLOR BLENDED VIDEO SIGNAL

[75] Inventor: James A. Wobermin, Arvada, Colo.

[73] Assignee: Ampex Corporation, Redwood City, Calif.

[21] Appl. No.: 585,779

[22] Filed: Sep. 20, 1990

[51] Int. Cl.[5] .............................................. G09G 1/28
[52] U.S. Cl. ..................... 340/703; 340/701; 340/747
[58] Field of Search .................. 340/701, 703, 747; 358/182, 183, 22 PIP

[56] References Cited

U.S. PATENT DOCUMENTS

| | | |
|---|---|---|
| 3,460,127 | 8/1969 | Pahlavan . |
| 3,713,135 | 1/1973 | Lazecki . |
| 3,739,369 | 6/1973 | Bunker et al. . |
| 3,816,849 | 6/1974 | Kinoshita et al. . |
| 4,149,184 | 4/1979 | Giddings et al. . |
| 4,262,290 | 4/1981 | Vallins . |
| 4,568,967 | 2/1986 | Freyberger et al. . |
| 4,591,843 | 5/1986 | Pratt . |
| 4,591,897 | 5/1986 | Edelson .............................. 358/182 |
| 4,679,040 | 7/1987 | Yan . |
| 4,956,638 | 9/1990 | Larky et al. ........................ 340/703 |

Primary Examiner—Ulysses Weldon
Attorney, Agent, or Firm—John S. Bell; Richard J. Roddy

[57] ABSTRACT

A symbol generator that provides a video color signal that presents different colors for different portions of a symbol is illustrated herein. The symbol generator includes a number of separate stages that are connected in series to provide a processing pipeline. Elements for providing vertical color blends between the top of a symbol or selected background area and bottom of the symbol or background area are divided between the processing stages. Vertical color blending is achieved by mixing a difference color into a start color in an amount determined by the depth or displacement of consecutive raster lines from the top of the symbol.

11 Claims, 5 Drawing Sheets

SYSTEM FOR GENERATING COLOR BLENDED VIDEO SIGNAL

BACKGROUND OF THE INVENTION

This invention relates to apparatus for generating and modifying video signals. The invention is described embodied in a symbol generator but may also be included in character generators, video graphics devices, paint systems, animation systems and video special effects devices. One type of symbol generator is comprised of a series of stages that define a signal processing pipeline which regenerates a complete desired video color signal each field. That system does not include the capability to provide a color blended symbol or symbol in which the color gradually changes from one area to another. It is a goal to add color blend capability to this type symbol generator without reducing the quality of the output video signal. Another goal is to provide the color blending without limiting the operating rate of the overall symbol generator, and also without requiring an excessive amount of additional circuitry that would substantially increase the cost and complexity of the symbol generator.

Another type of symbol generator utilizes frame buffers to provide and update video signals from one field or frame to the next. Frame buffer systems include separate picture element or storage locations for recording data pertaining to each separate display locations of a video display raster. Frame buffer systems calculate the video signal for each picture element separately and can provide color blends. Specifically, the framebuffer systems processes blocks of data representing portions of a video image each field, formulate vectors, and fill memory blocks of the frame buffer with the desired signal values. Frame buffer systems generally cannot modify a complete video image in real time. The frame buffer design requires a very large amount of data to be processed to provide and update video signals. Complex electronics are needed to identify the portion of the display to be modified and manipulate blocks within the buffer memory representing those portions of the image.

SUMMARY OF THE INVENTION

This invention provides a system for generating a video color signal that includes improved apparatus for providing color blends. Elements for providing color blends are distributed throughout the system in an efficient configuration that minimizes complexity and enhances both effective high speed performance and the overall capability of the system. The invention is illustrated herein embodied in a symbol generator. The symbol generator is comprised of a central processing unit (CPU) that calculates the coordinates of symbol boundaries, and a graphics engine that applies the symbol boundary coordinates and other parameters received from the CPU to regenerate a complete video color signal each field. Specifically, the graphics engine sorts the boundary points or line segments of all symbol boundaries according to the video raster order and provides color signals in sequence for each of the determined boundary locations. Color blends are provided by generating two color signals for boundary points that define a blended area. One of the two color signals for each boundary point is multiplied to change its color value by an amount that is determined by boundary location. The other one of the two color signals and the product of the multiplied signals are then added together to produce an output color signal. According to this procedure, signals representing adjacent locations are multiplied by different values to produce combined color signals for selected areas that gradually blend from one color to another.

The graphics engine is comprised of a series of hardware stages that define a signal processing pipeline. The pipeline stages include elements for providing vertical color blends or color changes between the top of a symbol or top of a background area and the bottom of the symbol or background area. These elements are distributed throughout the processing stages. A vertical sorter stage provides a depth signal for each symbol that indicates the displacement of each raster line from the first or top line of the symbol. The depth signal has a value that varies between zero and one and can thus be conveniently applied to change the color value of a color signal. This depth signal becomes part of the boundary data generated for each boundary line segment in the processing pipeline. The boundary data is sorted according to position along raster scan lines. The sorted depth signal values for each boundary are used to generate a multiplied depth signal that simplifies handling of multiple boundaries and increases distinction between overlapping symbols. A color palette which is a look memory that has sufficient storage capacity for two color values associated with at least a portion of the palette addresses provides a start color and difference color. The start and difference color are provided to a mixer which mixes the difference color into the start color in an amount determined by the depth signal. This mixing produces color blends. Non-linear and other modified color blends are provided by multiplying depth signals by preselected function values before varying the difference color.

DETAILED DESCRIPTION

Figure 1:
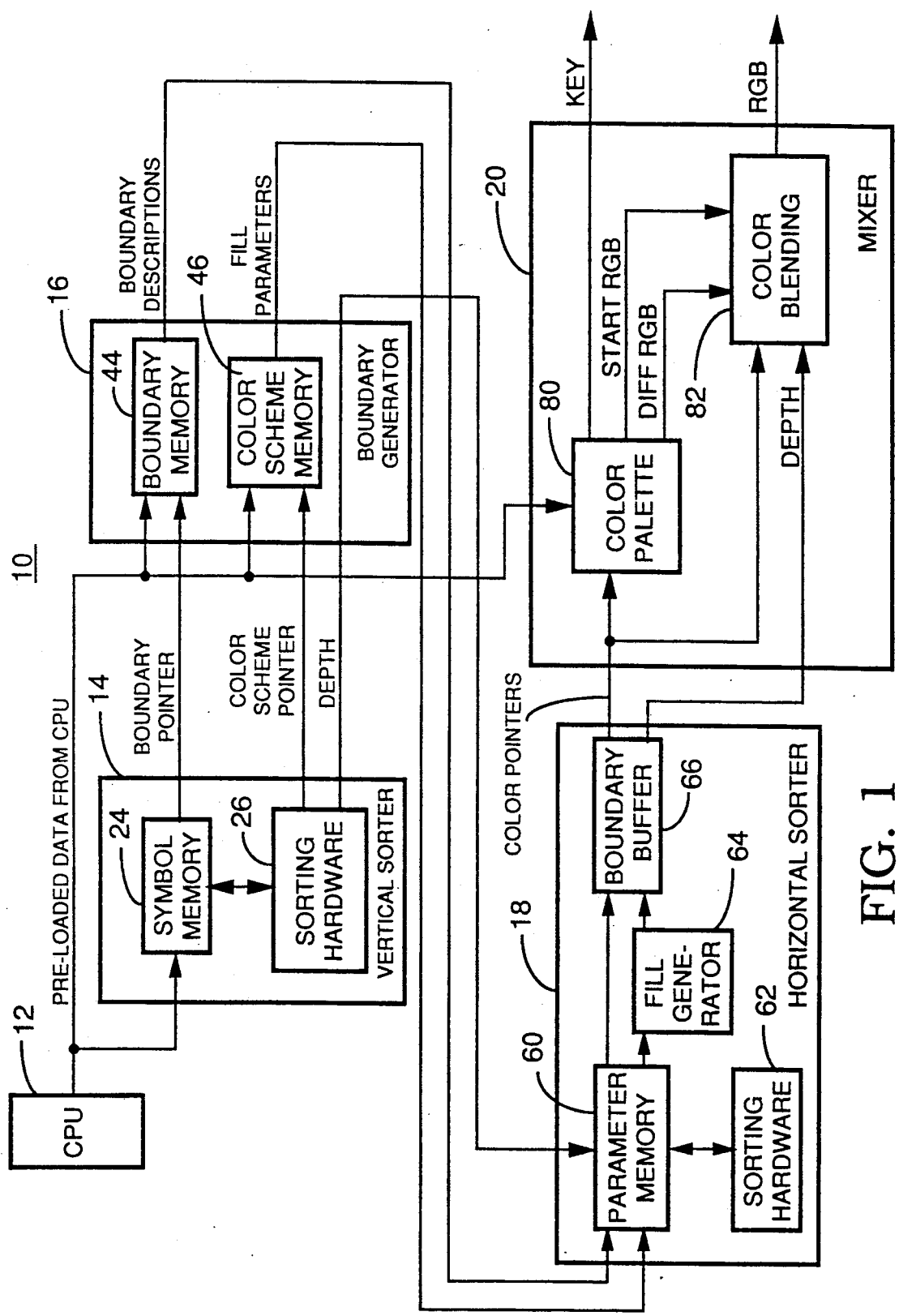
FIG. 1 is a block level diagram of a symbol generator that incorporates the color blend features of this invention.

FIG. 1 illustrates a symbol generator 10 for providing a video color signal which typically would be displayed on a CRT display monitor in combination with other information. Generator 10 is comprised of a CPU 12, a vertical sorter 14, a boundary generator 16, a horizontal sorter 18 and a mixer 20. The CPU 12 calculates the coordinates of the points or line segments of symbol boundaries by solving equations for those boundaries and also provides other values for each symbol that are used in subsequent signal processing. The vertical sorter 14 sorts symbols according to y axis or raster line position. The boundary generator 16 generates values that represent boundary crossings in a video raster coordinate system. The horizontal sorter 18 sorts boundary coordinates in horizontal order along raster lines. The mixer stage 20 generates, processes and combines color signals to provide an output color signal that represents a desired video image.

CENTRAL PROCESSING UNIT (CPU)

The CPU is comprised of a general purpose microprocessor programmed to calculate the coordinates of the line segments that comprise the boundaries of selected symbols. The coordinates are obtained by solving equations that describe the shape of symbol boundaries. For letters and numbers, the coordinates are generally called font coordinates and the equations are called typeface equations. Examples of such equations include Bezier curve equations, conic curve equations and linear or line equations (vectors). The boundary coordinates calculated by the CPU are specific to each symbol and independent of the intended location of the symbol in a display. Such independently calculated coordinates are sometimes referred to in the art as bounding box coordinates. The CPU classifies and sorts the calculated line segment coordinates and also provides other values for further processing. This additional calculation is explained with reference to FIG. 2.

Figure 2:
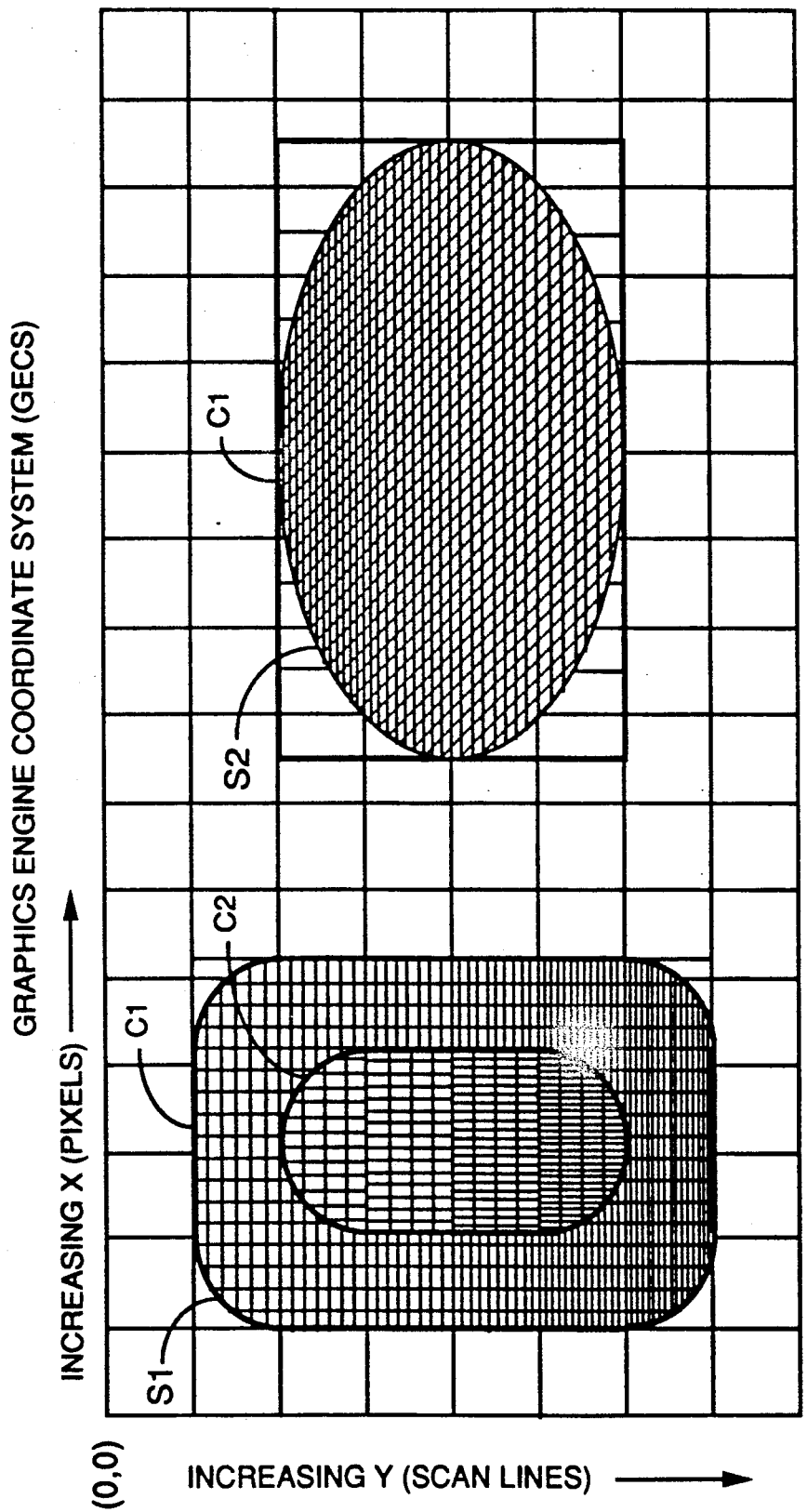
FIG. 2 is an illustration of a video raster display of two symbols.

FIG. 2 illustrates two symbols S1 and S2 presented on a graphical representation of a video raster that is shown in exaggerated proportion for illustration. The x integers or graph lines illustrate width in units corresponding to the spacing between the discrete picture elements or display locations disposed along the parallel lines of a television raster. The y integers illustrate height in units that correspond to the spacing between raster scan lines. The specific symbols S1 and S2 are intended to generally represent different video characters or objects which could have substantially any shape or configuration. Symbol S1 is defined by two boundary lines or closed contour lines C1 and C2. Symbol S2 is defined by one closed contour boundary line C1. The calculated coordinates provided by the CPU for symbols S1 and S2 represent small segments of the contour lines that are each one scan line high.

The CPU identifies the different line segments or coordinate points of each boundary as being either right or left boundaries. A line segment or portion of a contour line is designed to be a left boundary if it is disposed along the left edge of the area contained within the boundary and right edge if it is disposed along the right edge of a contained area. The sides or edges of each closed contour boundary are determined to be either left or right without regard to any other boundary in the symbol. For example, the opposite side of the boundary contour C1 of symbol S1 are defined as left and right boundaries without regard to the presence of boundary contour C2 within the area defined by boundary C1. Edges are determined to be either left or right by reading the x coordinate values along each y coordinate raster line. One boundary line or contour may have several different right sections and left sections. The left most boundary point of a contour that intercepts a scan line is a left boundary, the next a right, the next a left, and so forth. Left/right boundaries are collected into boundary pairs with the members of each pair belonging to the same contour.

The x coordinates of the calculated line segments are sorted according to vertical or y axis order. The sort is accomplished by reading the y coordinate values of the contour points of a symbol. This vertical sort is specific for each symbol, independent of any other symbol and does not reflect other factors such as the position in a display at which an operator may choose to place the symbol. The sort does mix the contours of each individual symbol that contains more than one contour. That is, all coordinate points of all contours of a symbol on one horizontal scan line are grouped together before listing points on the next line. The CPU sets a reference bit to identify the end of each raster line and records the total scan line height of each symbol. When these calculations are completed the y coordinates of the calculated boundary points are not required in further processing.

The CPU also assigns various reference numbers to each calculated symbol. These include a memory location number that is referred to as symbol name, a color scheme number, contour numbers, and a raster location of a reference point for each symbol. The symbol name identifies an initial memory location or starting point in boundary generator 16 containing symbol parameters for that symbol. The symbol name is used as described hereinafter in vertical sorting. The color scheme number and contour numbers are used in the subsequent stages to generate address pointers to a color palette. The color scheme number is variable and can be changed to change the color of a symbol. The contour numbers are fixed and are specific to each symbol. In a typical example the two boundaries or contour lines C1 and C2 of symbol S1 would be given contour numbers of one and two respectfully. The singal contour line that defines S2 would be given a contour number of one. The raster location number assigned to each symbol defines the x and y raster coordinates of the upper left hand corner or top left bounding box pixel of a symbol. (The terms left and right are used herein according to standard convention relative to a video raster. A raster scan begins at the upper left hand corner or coordinate location (0, 0) in FIG. 2 and proceeds from left to right along horizontal lines in sequence from the top to the bottom of the raster.) The value of the location number is not restricted and may correspond to any point on a display raster either aligned with a pixel, or part way across or between pixels in either the x or y directions. In a operation, the reference location number is changed to move a symbol or cause it to be in a different position in a subsequent frame.

VERTICAL SORTER

The vertical sorter 14 is comprised of a symbol memory 24 which receives selected parameters from the CPU 12, and sorting hardware 26 which uses those parameters to provide vertical sorting. The sorter 14 provides vertical sorting by generating a sequence of addresses to memory locations in the boundary generator 16 that read out stored values on a scan line by scan line basis. The address sequence for each raster scan line is generated by providing a linked list of addresses to storage locations in memory 24 that contain parameters for each symbol on that scan line. The sorting hardware uses those parameters to generate numbers that point or lead to addresses in boundary generator 16.

Symbol memory 24 is comprised of two memories or sets of registers 28 and 30. Memory 30 is an extension of memory 28. These memories are shown separately to facilitate description, as they receive different symbol parameters which are transmitted to different locations and used differently in generating a video output signal.

Memory 28 receives the name, height and y coordinate of the display reference point for each symbol to be included in a display. Memory 30 receives the color scheme number and x coordinate of the reference point. Each register of the symbol memory 28 and corresponding register in memory 30 contain reference parameters for one symbol. The entries for different symbols need not be arranged or sorted in any particular register order.

Figure 3:
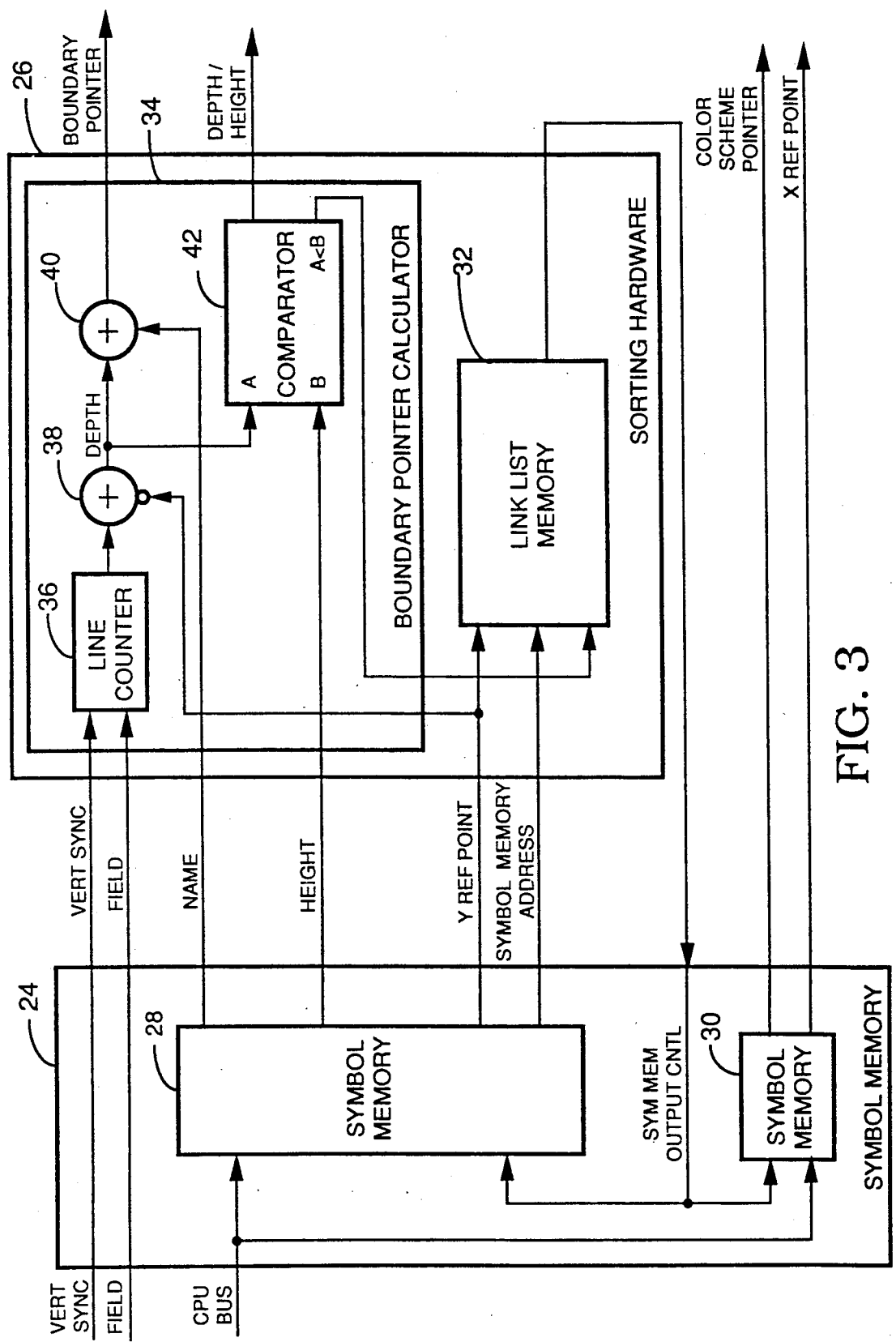
FIG. 3 is a more detailed block level diagram of the vertical sorter stage of the symbol generator of FIG. 1.

The sorting hardware 26 is shown in more detail in FIG. 3. This hardware includes a link list memory 32 for accessing symbol memory 28 and a boundary pointer calculator 34 for providing output numbers that access addresses in the boundary generator 16. There are a number of different ways of achieving linked list memories. The preferred configuration of memory 32 comprises two linked memories that are interconnected such that numbers loaded into storage registers of the first memory identify addresses in both the symbol memory 24 and in the second linked list memory. Entries in the second linked list memory define addresses of both the symbol memory 24 and other addresses of the second memory. Only one address may be included in each individual register of the linked memories. The first linked memory includes one storage register or address location for each scan line of the video raster. The complexity of link lists required for sorting is minimized by providing an initial list for each raster line that includes pointers to memory 24 for each symbol whose reference locations falls on that raster line. When there is more than one symbol on a scan line the register address of each consecutive symbol is loaded into the first linked memory. The address already in that memory is forwarded to the address in the second link list memory that is the same as the address in symbol memory 24 that contains data for the new symbol being placed on the scan line. This forwarding of symbol addresses can be applied to create link lists of any desired length.

Boundary point calculator 34 includes a line counter 36 and summing element 38 which determine the depth or displacement of each raster line from the top of a symbol. Summing element 38 substracts the y value or scan line of the symbol reference point from the instant scan line to provide the line depth signal. The calculator 34 also includes a second summing element 40 which adds symbol name to the depth of each scan line to provide boundary pointers to symbol generator 16. The pointers for each symbol are equal to the depth or distance into the symbol of the line being scanned plus symbol name. The calculator further includes a comparator 42 which compares the depth value for each raster scan line with symbol height or the total of scan lines that intercept a symbol. Comparator 42 divides depth by height to produce a depth number between 0 and 1 that indicates how far a particular raster line is into a symbol. If this depth value is equal to one or less, the depth is less than the symbol height, and comparator 42 provides an output to memory 32 which directs that the address for that symbol be added to the linked list for the next line. Comparator 42 also provides the depth number or depth divided by height to boundary generator 16 in a timed relationship relative to transmission of boundary pointers to generator 16 such that the depth value becomes part of the boundary data for all applicable boundary line segments.

BOUNDARY GENERATOR

Figure 4:
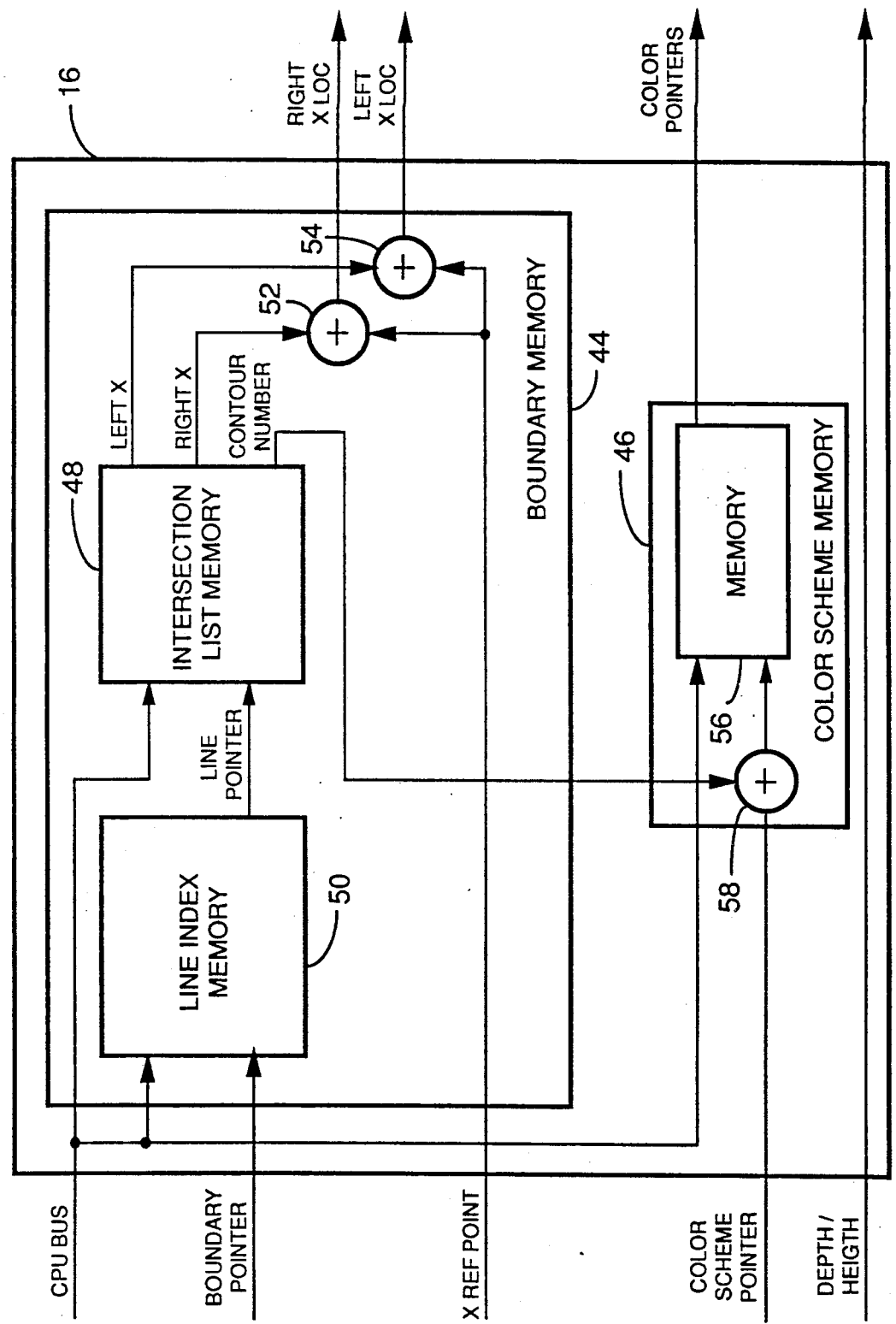
FIG. 4 is a more detailed block level drawing of the boundary generator stage of the symbol generator of FIG. 1.

Boundary generator 16 is comprised of a boundary memory 44 for converting left/right boundary pairs provided by the CPU to values that represent left and right boundary line segments in a raster coordinate system. Boundary generator 16 also includes a color scheme memory circuit 46 for providing color pointers or address numbers that are processed in the horizontal sorter stage 18 to provide signals or signal values that access addresses in a color palette in the mixer 20. As is illustrated by FIG. 4, the boundary memory 44 is comprised of an intersection list memory 48 that is loaded by the CPU with symbol parameters, and a line index memory 50 that receives look up address numbers or pointers to storage registers to intersection list memory 48. Memory 48 receives the bounding box x coordinate pairs and contour numbers for each symbol calculated by the CPU. In more complex embodiments of symbol generator 10 that include other capabilities, the data for each boundary line segment will also include other parameters. For example, in an embodiment that includes apparatus for anti-aliasing signal values to eliminate jagged edge symbol boundaries, the boundary data for each line segment would include values that define the slope at which the segment crosses the raster line. Such values are not shown or discussed in this application because anti-aliasing is separate from color blending. One feature of the color blending scheme is that it coexists conveniently with other functions. Color blending does not limit either the hardware or the processing time available for other functions.

The parameters for each symbol are sorted by the CPU before they are supplied to the boundary generator 16, and are loaded together in sorted order into consecutive registers of the intersection list memory 48. Different symbols can be loaded into memory 48 in any order so long as all entries for each symbol are kept together in a defined block. The CPU loads pointers into consecutive registers in the line index memory 50 that identify the first register address of intersection list memory 48 containing boundary values for each consecutive line of a symbol. For example, symbol S1 is shown in FIG. 2 intercepts six raster lines. Pointers to the registers of intersection list memory 48 that contain the first entry for each of the six lines are provided to six consecutive registers of line index memory 50. Consecutive entries in line index memory 50 will generally not point to consecutive line index memory 48, as symbols will often include more than one boundary pair on each raster line. The CPU therefore presets a bit in the last entry of each raster line in intersection list memory 48 to control read out. The first register or memory location in line index memory 50 for each symbol is the name of that symbol. As discussed above symbol name is determined by the CPU in loading memories 48 and 50 and recorded in the symbol memory 28 of the vertical sorter 14. Boundary parameters recorded in memory 48 are read out by vertical sorter 14, which provides a sequence of addresses in scan line order to registers addresses of line index memory 50. Values in the line index memory 50 read out registers in intersection list memory 48. The x coordinates at each of the addressed locations of the intersection list memory 48 are provided to summing elements 52 and 54. These elements add the x location of the reference point for each symbol to the boundary line coordinates to provide the x coordinate values of boundary line segments in a raster coordinate system.

Color scheme memory circuit 46 includes a memory 56 that is pre-loaded by the CPU with numbers that are determined by the color scheme that the operator desires. Memory circuit 46 also includes a summing element 58 that adds the contour number for each boundary received from boundary memory 44 to the color scheme number for the symbol. Color scheme numbers are provided to summing element 50 from symbol memory 30 of vertical sorter 14. The summed number provided by element 58 is an address number to color scheme memory 56 that determines the value of the output signal from memory 56. The color scheme memory 56 permits an operator to select a more complex color scheme and to change the color of a symbol more easily than if the summation signal provided by adder 58 were used directly to generate addresses to a color palette independent of memory 56.

HORIZONTAL SORTER

The horizontal sorter 18 is comprised of a parameter memory 60 and sorting hardware 62 which cooperate to sort boundary parameters according to position along each raster line. The horizontal sorter 18 also includes a fill generator 64 that further processes the color address pointers and depth values associated with the boundary line segments, and a boundary buffer 66 that stores the boundary parameters for each field to reduce time limitations on the overall system operation.

As discussed, the boundary parameters associated with each line segment include the x coordinate or position of the boundary along the raster line, the identification of the boundary as either a left or right boundary, the color address provided by color scheme memory 46 and the depth value for the boundary. There are a number of different ways to achieve horizontal sorting of boundary parameters just as there are different ways to achieve vertical sorting. The preferred configuration for the parameter memory 60 and sorting hardware 62 is to maintain left/right designations of boundaries by loading right boundaries into even numbered registers of memory 60 and left boundaries into odd numbered registers. Sorting hardware 62 reads the x coordinate of boundary values loaded into memory 60 and provides a read out index or list of values to be read out in increasing x coordinate order.

Figure 5:
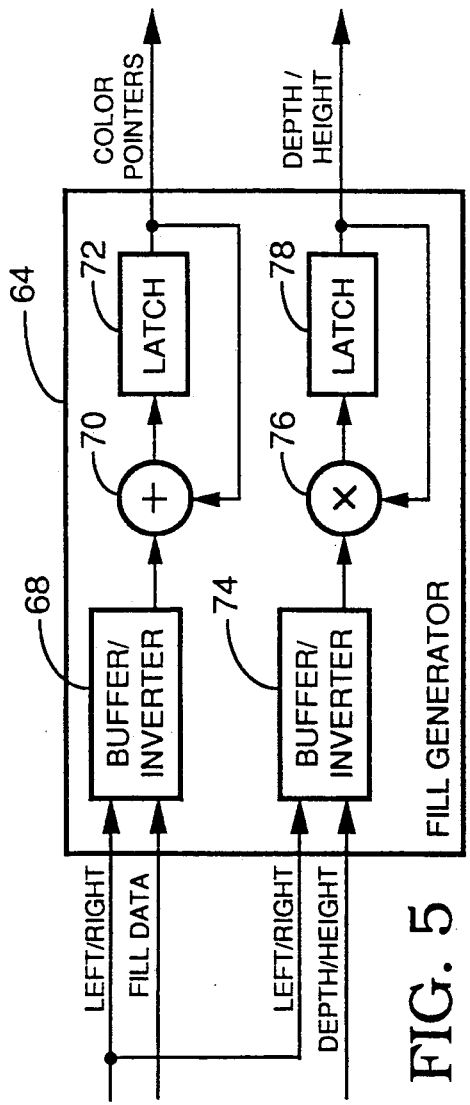
FIG. 5 is a more detailed block level diagram of the fill generator circuit in the horizontal sorter stage of the symbol generator of FIG. 1.
Figure 6:
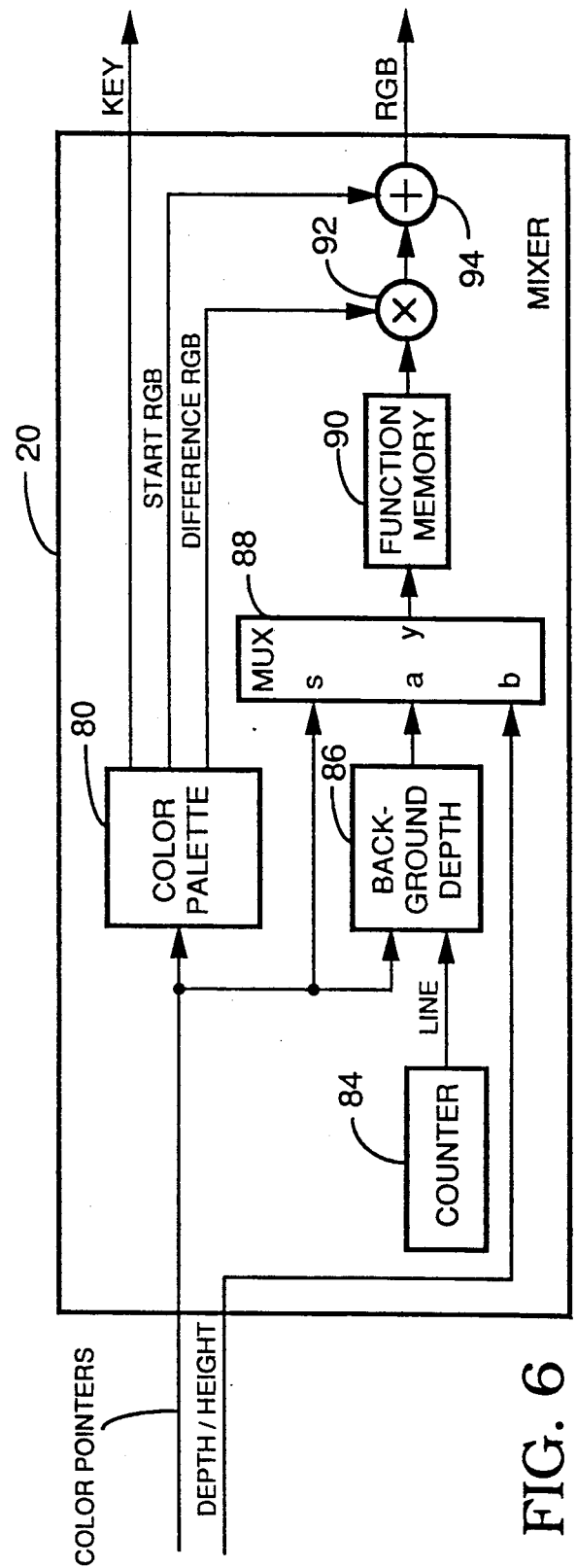
FIG. 6 is a more detailed block level diagram of the mixer stage of the symbol generator of FIG. 1.

The fill generator 64 included in horizontal sorter 18 is shown in more detail in FIG. 5. Generator 64 is comprised of a buffer inverter 68, adder 70 and latch 72 for providing a summed color address signal. The generator also includes a second buffer inverter 74, multiplier 76 and latch 78 for providing a multiplied depth signal or product signal. The summed and multiplied signals provided by fill generator 64 simplify processing of consecutive boundaries on each raster line. Buffer inverter 68 receives color pointers from parameter memories 60 and a bit that indicates whether the color number is for a left or right boundary. Inverter 68 inverts right boundaries. Latch 72 retains the last provided output signal and recirculates that signals to the adder 70. Adder 70 applies color pointer numbers for left boundary points to increase the output signal provided by the fill generator and thus increase the color palette register address that is accessed at a left boundary point. Since color address numbers for right boundaries are inverted, each color pointer for a right boundary point reduces the output number provided by fill generator 64. The summed color pointer or address signal provided by fill generator 64 may have a 0 value. Zero values are data points and are provided to boundary buffer 66 the same as other signal values. Zeros represent the color palette address of the background color.

The fill generator path for providing a multiplied depth or depth/height signal is similar to the path for providing the summed color address signal. The multiplied depth/height signal provided by this path is given an initial value of one rather than zero. Buffer inverter 74 receives depth signals or depth divided by height from the parameter memory 60 and a bit that indicates whether the depth number is for a left or right boundary. Multiplier 76 multiplies depth values for left boundaries by the prior boundary value. Right boundary values are inverted, and depth values for right values thus divide the prior boundary value. The processing of both color pointer signals and depth signals provided by the fill generator 64 is both associative and communicative. Each right boundary point generates a signal change that offsets the prior addition or multiplication provided for the corresponding left boundary point of the same symbol contour line. The use of multiplication and division for processing depth signals rather than addition and substraction produces blends for overlapping symbols that vary at different rates. This provides an added distinction between different symbols and symbol contours.

The output signals provided by fill generator 64 are transmitted to boundary buffer memory 66 which also receives the display coordinates associated with those signals from parameter memory 60. Memory 66 is a first-in first-out memory that retains signal values for one field. The one field delay provided by memory 66 permits the generator 10 to use time averaging to generate signals representing images that include more boundaries on some scan lines than can be processed in one television horizontal line interval. The coordinate locations of the color address and depth signals represent the locations of boundary points both on a raster display and also in the color signal to be provided by the generator 10. Those coordinates control the timing or readout of the address signals from buffer memory 66 to mixer 20. Buffer 66 begins transmission of parameters for each boundary line segment upon receipt of a control count equal to the coordinate location of that boundary point and maintains the parameters as output signals until the control count reaches the address of the next boundary. The control count supplied to boundary memory 66 is provided by a counter included in mixer stage 20.

MIXER

Mixer 20 is comprised of a color palette 80 and color blending circuit 82. The color palette 80 is a look up table that is pre-loaded by the CPU with the color values that an operator desires to generate. In a typical palette each address location contains four eight bit registers, one for each of the red, green, and blue components of a color signal, or corresponding components in another color system, and one for a key signal. Values loaded into these individual registers determine the color provided when that location is accessed by an address signal from boundary buffer 66. Color palette 80 differs from other palettes in that at least of portion of the address locations include three additional eight bit registers which contain the red, green and blue components of a second color signal. When a color pointer or address signal that designates one of these locations is provided to palette 80, the palette provides two output color signals. These signals are referred to herein as a start color and difference color. The difference color is a signed number or number that may have either a positive or negative value. In a digital system with registers of 8 bit length, each component of the start color may have a value between 0 and 255. The difference color components may vary between −127 and +127. The difference color component is multiplied by two when applied to be of the same scale as the start color.

The blend circuit 82 includes a counter 84 and depth calculating circuit 86. These two elements provide a depth signal for background areas that is similar to the depth/height signal generated for specific symbols in the vertical sorter 14. Depth circuit 86 is a divider circuit that divides the raster line count received from counter 84 by the total number of raster lines in each field of the output color signal. If the generator 10 is being used to provide a full screen NTSC standard signal, for example, circuit 86 would divide the line count by 525. This division provides a depth number that varies from zero at the top of a raster or video display to a value of one at the bottom. The counter 84 also controls other functions such as read-out of boundary buffer memory 66. The counter is responsive to external control signals for the overall video system, i.e. the pixel clock, horizontal sync and vertical sync signals that are generated outside the symbol generator to control operation of other devices in addition to the with generator such as elements for providing a visual video display. The control counter 84 includes a pixel counter that is clocked by (reads) the external pixel clock and is reset by the horizontal sync signal, and a line counter that is clocked by the horizontal sync signal and reset by vertical sync.

The color blend circuit 82 also includes a multiplexor 88 which selects between transmission of depth signals for either the background area or for a specific symbol. Selection is determined by whether the color pointer received by the mixer 20 designates an address that has been preselected for background color. Depth signals transmitted by the multiplexor 88 index a function memory 90 that has been preloaded by the CPU with functions that will provide various desired signal modifications. Function memory 90 may provide an output signal that is equal to the input value. This produces a straightforward linear color change between the top and the bottom of a symbol. Or, the output may have a modified variation between 0 and 1 to provide other effects such as non-linear changes. Inverted blends can be provided by varying from 1 to 0 instead of from 0 to 1. If the output of function memory 90 is changed on a pixel by pixel basis a horizontal blend or a color change along raster lines will be provided. The output signal from function memory 90 is provided to multiplier 92 which applies that signal to multiply the difference color from color palette 80. Adder 94 adds the start color and multiplied difference color to provide an output color signal.

As an arbitrary illustration, of the color blending or change in the color value of the RGB signal provided by mixer 20, consider a start color having a red value of 254 and green value of 0, and a difference color having a red value of −127 and a green value of +127. The difference color will be multiplied by values that increase from 0 for the first raster line at the top of a symbol to 1 for the bottommost raster line of the symbol. The color signal provided by the mixer 20 is completely red at the top of the symbol as both the red and green values of the difference color signal have multiplied values of 0. The multiplication of the color difference signal for each consecutive line into the symbol causes increasing amounts of red to be subtracted and increasing amounts of green to be added to the start color. The color of the symbol is thus gradually blended from red at the top to completely green at the bottom.

Having thus described this embodiment of the invention, a number of modifications will be readily apparent to those skilled in the art. The invention is defined by the following claims.

What is claimed is:

1. A system for generating a video color signal comprising:
   means for determining locations of boundaries between different colors;
   said means for determining the locations of said boundaries comprising means for determining the coordinates of boundary line segments in a video raster coordinate system;
   means for providing a first and second signal for each determined boundary location;
   said means for providing a first and second signal comprising (a) means for providing the same first signal value for all segments of a continuous boundary line and (b) means for providing a second signal having a value determined by displacement of the boundary location associated with that second signal from a selected reference raster scan line;
   said means for providing a second signal comprising means for providing a depth signal having a value for each determined boundary location equal to the displacement from the first raster scan line that intercepts the boundary divided by the total number of raster scan lines that intercept the boundary;
   means responsive to said first signal for providing two color signals for each first signal;
   means for multiplying a first one of said two color signals by said second signal to change the color value of said first color signal; and
   means for combining a second one of said two color signals and the multiplied signals for each of said determined locations to provide consecutive portions of an output color signal.

2. The system of claim 1 in which:
   said means for determining the locations of boundaries comprise a series of stages which define a processing pipeline that sorts all boundary locations each field; and
   said means for providing said depth signal is disposed in a pipeline stage for sorting the positions of boundary line segments according to raster lines.

3. The system of claim 2 further including:
   means for identifying boundary line segments disposed along the left and right edges of an area contained within a boundary as left and right boundaries;
   a processing stage for sorting boundary locations according to position along raster lines; and
   means comprising a part of said means for providing said second signal, for providing a product signal by applying values of said depth signal in said sorted order to multiply said product signal for left boundaries and to divide the value of said product signal for right boundaries.

4. The system of claim 3 in which said means for providing a second signal further include means disposed in a color signal mixing stage for multiplying said product signal by predetermined functions to change the value of said product signal.

5. A system for generating a video color signal comprising:
   means for determining locations of boundaries between different colors;
   means for providing a first and second signal for each determined boundary location;
   means responsive to said first signal for providing two color signals for each first signal;
   said means for providing two color signals comprising look up memory means for storing two color signal values at each of a plurality of addressable storage locations and providing two color signals in response to receipt of an address signal value that designates one of said storage locations;
   said look up memory means comprising a color palette memory having sufficient storage capacity associated with each of said storage locations to store two color signals wherein each signal is comprised of three signal components;
   said color palette memory comprising means for storing and providing a start color signal value and difference color in each of said storage locations wherein said difference color may have either a positive or a negative value;
   means for multiplying a first one of said two color signals by said second signal to change the color value of said first color signal; and
   means for combining a second one of said two color signals and the multiplied signals for each of said determined locations to provide consecutive portions of an output color signal.

6. The system of claim 5 in which said addressable storage locations of said color palette memory are adapted to store RGB values for two different RGB color signals.

7. A system for generating a video color signal comprising:
   means for determining locations of boundaries between different colors;
   means for providing a first and second signal for each determined boundary location;
   means responsive to said first signal or providing two color signals for each first signal;
   said means for providing two color signals comprising look up memory means for storing two color signal values at each of a plurality of addressable storage locations and providing two color signals in response to receipt of an address signal value that designates one of said storage locations;
   said look up memory means comprising a color palette memory having sufficient storage capacity associated with each of said storage locations to store two color signals wherein each signal is comprised of three signal components;
   means for multiplying a first of said two color signals by said second signal to change the color value of said first color signal;
   means for combining a second one of said two color signals and the multiplied signals for each of said determined locations to provide consecutive portions of an output color signal;
   said color palette memory including a preselected storage location for storing two color signals for background portions of the video signal containing no video symbols; and
   the system further includes;
   means for providing a background depth signal having a value proportional to displacement from a first raster line; and
   signal selecting means responsive to the values of said first signals provided to said color palette memory for selectably transmitting said second signal and said background depth signal to multiply said first one of said two color signals provided by said color palette memory.

8. A system for generating a video color signal comprising:
   means for generating coordinates of boundary line segments of a symbol in a video raster scan coordinate system
   means for providing a first boundary signal having a value, which is the same for all segments of a continuous boundary line segment of the symbol;
   means for providing a second depth signal having a value for each provided boundary line first signal equal to the displacement from the first raster scan line that intercepts the boundary divided by the total number of raster scan lines that intercept the boundary line;
   means for identifying boundary line segments disposed along the left and right edges of an area contained within a boundary as left and right boundaries; and
   a processing stage responsive to the first boundary signal and to the second depth signal and to the identified boundary line segments,
   the processing stage including:
   means for sorting boundary locations according to position along raster lines;
   means for changing the color content of the video color signal; and
   means for generating a product signal by applying values of said depth signal in said sorted order to multiply said product signal for left boundaries and to divide the value of said product signal for right boundaries.

9. The system of claim 8 wherein the processing stage further including:
   means disposed in a color signal mixing stage for combining said product signal with predetermined functions to change the value of said product signal.

10. The system defined in claim 11 for providing color blends over a symbol to be color blended wherein the mixer stage means comprises:
    color palette means responsive to the sorted symbol boundary data for providing a start color signal and a difference color signal and
    color blending means for mixing the start color signal and the difference color signal by an amount determined responsive to the depth signal.

11. A system for providing colors blends over a symbol to be color blended comprising:
    a series of pipeline stages that define a signal processing pipeline, the pipeline stages including:
    vertical sorter stage means for providing a depth signal for each symbol that indicates the displacement of each raster scan line from a predetermined location of the symbol to be color blended;

boundary generator stage means for generating data defining the boundaries of the symbol to be color blended;

horizontal sorter stage means for sorting the symbol boundary data according to position along a video raster scan line;

mixer stage means responsive to the sorted symbol boundary data for mixing a plurality of colors over the symbol to be color blended.

* * * * *